(No Model.)
G. HANCOCK.
Fishing Reel.
No. 243,371. Patented June 28, 1881.
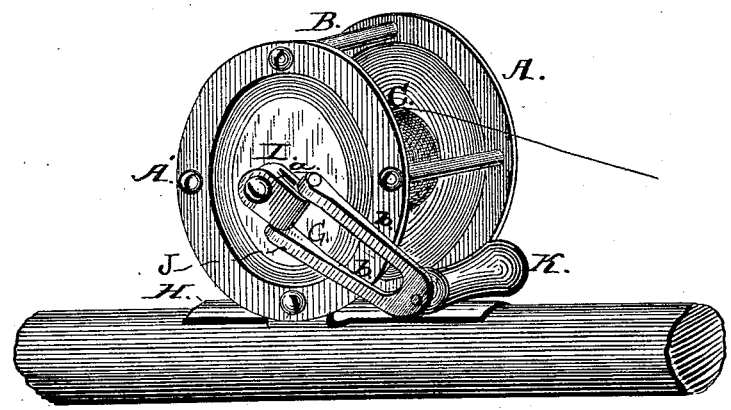
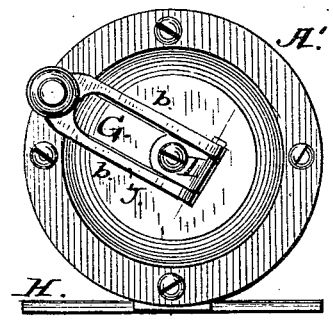 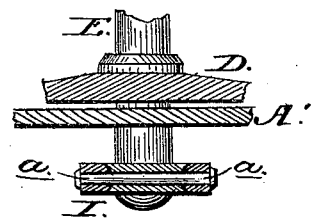
Witnesses
Fred G. Dieterich
Albert H. Krause
Inventor
George Hancock
By Parker H. Sweet Jr. atty

UNITED STATES PATENT OFFICE.

GEORGE HANCOCK, OF NORTH ADAMS, MASSACHUSETTS.

FISHING-REEL.

SPECIFICATION forming part of Letters Patent No. 243,371, dated June 28, 1881.

Application filed July 29, 1880. (No model.)

*To all whom it may concern:*

Be it known that I, GEORGE HANCOCK, of North Adams, in the county of Berkshire and State of Massachusetts, have invented certain new and useful Improvements in Fishing-Reels; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention has for its object to provide a simplified construction of fishing-reels, whereby the run of the line can be checked at will by the crank which winds the line upon the reel; and the invention consists, essentially, of a pivoted stop-crank adapted to be attached to the end of the reel for operation, all as will be hereinafter more fully described, and pointed out in the claim.

In the drawings, Figure 1 is a perspective view of my invention with the crank in position to act as a stop. Figs. 2 and 3 are detail views of the same.

Similar letters of reference indicate like parts in the several figures.

Referring to the drawings, A A' represent the end plates forming the frame of the reel, which are united together in the usual manner by the stretchers or short bars B. The spool C is also made in the usual way, with the two flanges D convex upon their opposite sides, and adapted to work in shallow recesses upon the inner sides of the end plates, A A', said spool C being fixed immovably upon and forming a part of the axle E, which projects through and has its bearings in the end plates, A A', and is provided upon one end with the pivoted crank G. To the lower part of the reel-frame is riveted or otherwise suitably secured the plate H, which is adapted for securing the reel to the rod in a manner well known. The pivoted crank G is composed of two parts, the one of which is a rectangular block, I, secured immovably to the end of the axle E, and having concave recesses *a* upon its sides, which are adapted to receive the side bars, *b*, of the other portion, J, of the crank, which is provided with a handle, K, at the smaller or bent portion thereof, and the projecting ends of the side bars, *b*, being loosely pivoted or hinged to one end of the block I, as shown in the drawings. It will be observed that this U-shaped portion J forms a spring in itself, which, when turned or doubled down upon the block I, causes the side bars, *b*, of the same to slip into the recesses *a* of the block I and hold the two parts in position to wind the line upon the reel. The pivoted spring-crank G, when used as a stop for the running line upon the reel, is adapted for operation by turning the U-shaped portion J up out of the recesses *a*, over against the side of the end plate, A, and upon a true line with the same, and the handle K, projecting over the front of the reel and upon the top of the rod, forms a lock or stop to the motion of the axle, and thereby prevents the line from being unwound therefrom.

By means of the present simplified construction the expensive and cumbersome devices for preventing the run of the line are done away with, and a much lighter reel can be used. The pivoted spring-crank G not only serves to reel up the line as in the usual manner, but also serves as a stop without changing the hand from it to another part of the reel.

It will also be observed that my invention is not only applicable to the ordinary "plain" reel, but to the "multiplying" style as well.

The advantages of my invention will be readily apparent without a more minute description, inasmuch as it combines in its construction and operation a high degree of simplicity and utility with a ready adaptation to the purpose contemplated.

Having thus described my invention, what I claim as new and useful is—

As an improved article of manufacture, the herein-described pivoted stop-crank for fishing-reels, consisting of the crank formed of the two parts I and J, the latter of which is provided with the handle K, and with the arms *b*, which are adapted to fold upon the part I, which is rigidly attached to the end of the shaft E, substantially as specified.

In testimony that I claim the foregoing as my own I affix my signature in presence of two witnesses.

GEORGE HANCOCK.

Witnesses:
  C. T. RICHMOND,
  S. H. FAIRFIELD.